US011893394B2

(12) United States Patent
Mora-Golding et al.

(10) Patent No.: US 11,893,394 B2
(45) Date of Patent: Feb. 6, 2024

(54) VERIFYING A BOOT SEQUENCE THROUGH EXECUTION SEQUENCING

(71) Applicant: Denso Corporation, Kariya (JP)

(72) Inventors: Carlos Mora-Golding, Southfield, MI (US); Ameer Kashani, Southfield, MI (US); Gopalakrishnan Iyer, Santa Clara, CA (US); Hirofumi Yamashita, Southfield, MI (US)

(73) Assignee: DENSO CORPORATION, Kariya (JP)

( * ) Notice: Subject to any disclaimer, the term of this patent is extended or adjusted under 35 U.S.C. 154(b) by 16 days.

(21) Appl. No.: 17/713,544

(22) Filed: Apr. 5, 2022

(65) Prior Publication Data
US 2023/0315484 A1  Oct. 5, 2023

(51) Int. Cl.
*G06F 9/4401* (2018.01)

(52) U.S. Cl.
CPC .......... *G06F 9/4405* (2013.01); *G06F 9/4406* (2013.01); *G06F 9/4411* (2013.01)

(58) Field of Classification Search
CPC .... G06F 9/4405; G06F 9/4406; G06F 9/4411; G06F 21/56
See application file for complete search history.

(56) References Cited

U.S. PATENT DOCUMENTS

| | | | | |
|---|---|---|---|---|
| 2002/0059564 A1* | 5/2002 | Bader | ...................... | G06F 8/443 717/140 |
| 2007/0220351 A1* | 9/2007 | Jung | ...................... | G06F 11/28 714/E11.178 |
| 2014/0215196 A1* | 7/2014 | Berlin | ...................... | G06F 21/575 713/2 |
| 2015/0058997 A1* | 2/2015 | Lee | ...................... | G06F 9/45558 726/26 |
| 2016/0055338 A1* | 2/2016 | Jeansonne | ............... | G06F 21/56 726/1 |
| 2018/0060568 A1* | 3/2018 | Galenson | .............. | G06F 21/554 |
| 2020/0125732 A1* | 4/2020 | Iyer | ...................... | G06F 16/9024 |
| 2021/0034489 A1* | 2/2021 | Klapper | .................. | G06F 21/55 |
| 2021/0064514 A1* | 3/2021 | Slobodskoy | ........ | G06F 11/3636 |
| 2022/0092179 A1* | 3/2022 | Zhang | ...................... | G06F 21/54 |
| 2023/0017231 A1* | 1/2023 | Ozga | ...................... | G06F 21/52 |
| 2023/0078692 A1* | 3/2023 | Cai | ........................ | G06F 9/4411 713/2 |
| 2023/0198775 A1* | 6/2023 | Liu | ....................... | G06F 3/0604 713/2 |
| 2023/0208855 A1* | 6/2023 | Sheriff | ................ | H04L 63/1425 726/22 |

* cited by examiner

*Primary Examiner* — Aurel Prifti
(74) *Attorney, Agent, or Firm* — Christopher G. Darrow; Darrow Mustafa PC

(57) ABSTRACT

Systems, methods, and other embodiments described herein relate to validating programs of a computing system in a vehicle by tracking a boot sequence. In one embodiment, a method includes, responsive to detecting initiation of a boot sequence in a computing system, tracking characteristics of programs executing as part of the boot sequence. The method includes determining whether the programs correspond with a program execution graph (PEG) by comparing the characteristics of the programs as the programs boot with the PEG. The method includes providing a response to thwart a malicious program when the boot sequence does not match the PEG.

17 Claims, 4 Drawing Sheets

VERIFYING A BOOT SEQUENCE THROUGH EXECUTION SEQUENCING

TECHNICAL FIELD

The subject matter described herein relates in general to systems and methods for verifying a boot sequence and, more particularly, to tracking an execution sequence of programs during boot to protect against malicious attacks.

BACKGROUND

Traditionally, vehicle security has involved a vehicle owner using a physical key to lock a door, disarm an ECU immobilizer, and/or start a vehicle manually. As technology advances, vehicle systems have morphed into more complex systems that involve additional features but also encounter additional/different risks. For example, many vehicles now include electronic systems that have the ability to collect data about the operation of the vehicle, communicate with remote systems, receive/provide electronic controls, and so on. However, along with enriched features and connectivity to outside networks comes the potential for attacks by malicious actors on computing systems in the vehicle that provide for these advanced features. For example, malicious actors may attempt to gain access to vehicle systems in order to alter the operation of the vehicle, steal sensitive information, and so on.

Various computing systems within the vehicle can include a variety of programs that function together in order to provide for the noted functionality. To secure these programs, the system may validate the programs as a whole by, for example, checking the programs using a cryptographic hash to ensure the programs have not been modified. However, this approach is generally computationally intensive and thus tends to extend load times while also failing to prevent other forms of attacks that may interject different code into a boot sequence. As such, the noted systems can remain vulnerable to different attacks while also encountering difficulties with efficiently securing programs.

SUMMARY

In one embodiment, example systems and methods associated with verifying programs of a computing system in a vehicle by tracking a boot sequence are disclosed. As previously noted, malicious attacks on the computing systems of a vehicle can cause significant difficulties. While some attacks may simply expose sensitive information, other attacks may cause problems with the functioning of different vehicle systems. Moreover, because of the nature of a vehicle platform, some approaches to securing the computing systems may not be well suited because of limited computational resources, efficiency considerations, power availability, and so on.

Therefore, in one approach, a disclosed system functions to secure a computing system within a vehicle by analyzing a boot sequence as the computing systems execute programs on startup. For example, in one arrangement, the computing system implements a program execution graph (PEG). The PEG graphs relationships between programs in a boot sequence, such as an execution sequence of different programs (i.e., when a program loads) and function calls within a program. The PEG may be pre-generated from a trusted supplier as a mechanism for tracking the programs.

Accordingly, as the computing system boots, the noted approach functions to monitor characteristics of executing programs such that the monitoring process can compute a graph of the programs as a point of comparison against the PEG. Thus, the monitoring process may then compare the identified executing programs and an execution order thereof to the PEG in order to validate the boot sequence. When the observed boot sequence does not follow the PEG, the computing system may generate a response. The response may take different forms depending on the implementation but can generally include communicating a report to an operations center about the unauthorized execution. In further implementations, the computing system may take additional or alternative actions as part of the response, such as halting the boot sequence and so on. In this way, the present approach improves the security of programs by implementing an efficient mechanism for ensuring the validity of booted programs.

In one embodiment, a validation system is disclosed. The validation system includes one or more processors and a memory that is communicably coupled to the one or more processors. The memory stores a control module including instructions that, when executed by the one or more processors, cause the one or more processors to, responsive to detecting initiation of a boot sequence in a computing system, track characteristics of programs executing as part of the boot sequence. The control module includes instructions to determine whether the programs correspond with a program execution graph (PEG) by comparing the characteristics of the programs as the programs boot with the PEG. The control module includes instructions to provide a response to thwart a malicious program when the boot sequence does not match the PEG.

In one embodiment, a non-transitory computer-readable medium is disclosed. The computer-readable medium stores instructions that, when executed by one or more processors, cause the one or more processors to perform the disclosed functions. The instructions include instructions to, responsive to detecting initiation of a boot sequence in a computing system, track characteristics of programs executing as part of the boot sequence. The instructions include instructions to determine whether the programs correspond with a program execution graph (PEG) by comparing the characteristics of the programs as the programs boot with the PEG. The instructions include instructions to provide a response to thwart a malicious program when the boot sequence does not match the PEG.

In one embodiment, a method is disclosed. In one embodiment, the method includes, responsive to detecting initiation of a boot sequence in a computing system, tracking characteristics of programs executing as part of the boot sequence. The method includes determining whether the programs correspond with a program execution graph (PEG) by comparing the characteristics of the programs as the programs boot with the PEG. The method includes providing a response to thwart a malicious program when the boot sequence does not match the PEG.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements, or multiple elements may be designed as one element. In some embodiments, an element shown as an internal component of another element may be implemented as an external component and vice versa. Furthermore, elements may not be drawn to scale.

DETAILED DESCRIPTION

Figure 1:
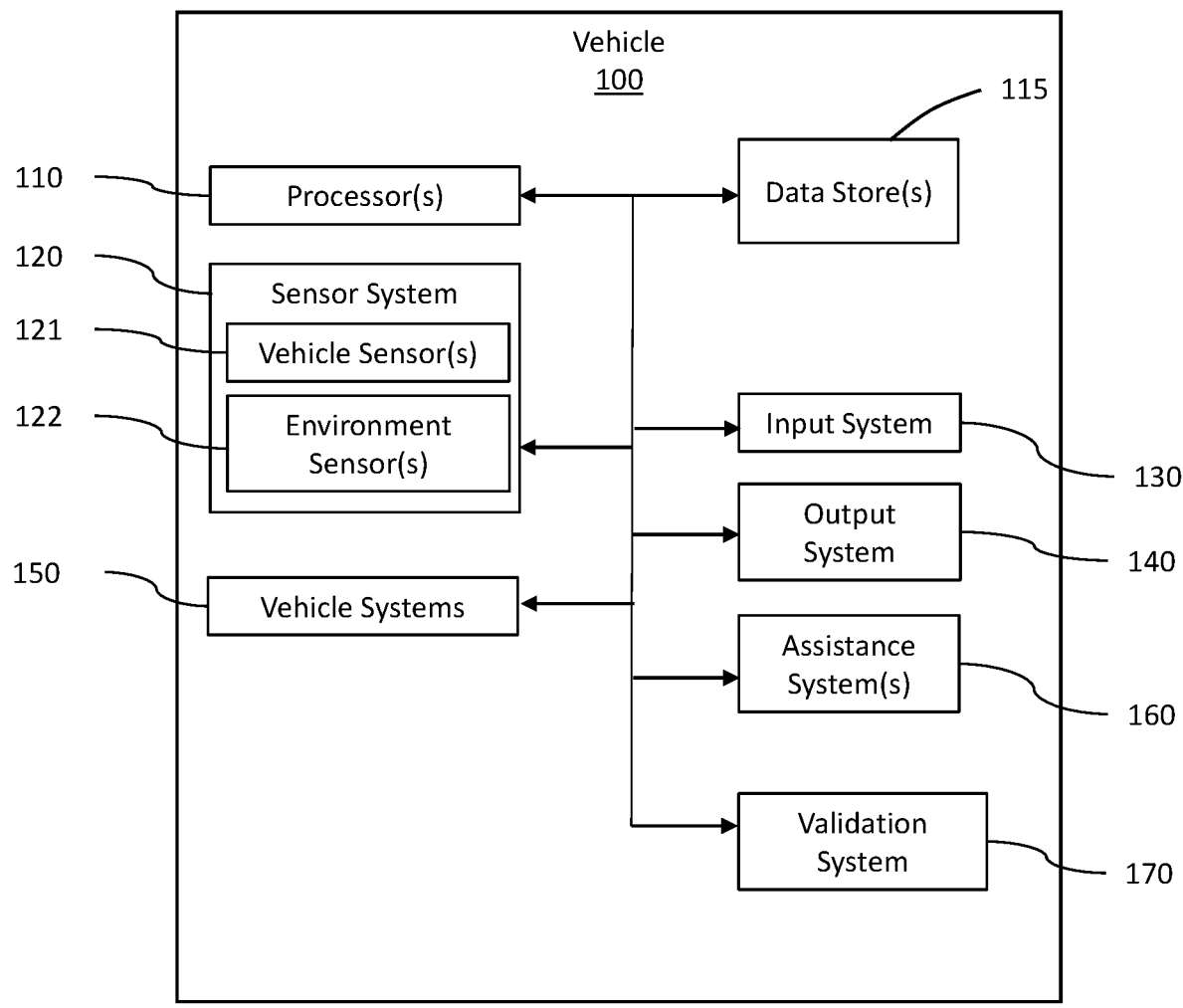
FIG. 1 illustrates one embodiment of a configuration of a vehicle in which example systems and methods may be implemented.

Systems, methods, and other embodiments associated with validating programs of a computing system in a vehicle by tracking a boot sequence are disclosed. As previously noted, malicious attacks on computing systems of a vehicle can cause significant difficulties. While some attacks may simply expose sensitive information, other attacks may cause problems with the functioning of different vehicle systems. This may be especially problematic when the effected systems are critical to the safe operation of the vehicle.

Moreover, because of the nature of a vehicle platform, some approaches to securing the computing systems may not be well suited because of limited computational resources, efficiency considerations, power availability, and so on. That is, resources within a vehicle are generally limited because of various considerations of a mobile platform, available power, other computing tasks, and so on. As such, complex cryptographic regimes that function to cryptographically secure a whole package of programs can cause extended load times and other difficulties.

Therefore, in one approach, a validation system functions to secure a computing system within a vehicle. The validation system may analyze a boot sequence as the computing system executes programs on startup. For example, the computing system uses a program execution graph (PEG), which is similar to a control flow graph (CFG), to track a boot sequence. In particular, the PEG graphs relationships between programs in a boot sequence, such as an execution sequence of different programs (i.e., when a program loads, including dependencies, such as libraries) and function calls within a program. The PEG may be pre-generated from a trusted supplier as a mechanism for tracking the programs. Thus, the PEG provides a known and trusted mapping of a boot sequence that is useful in identifying when an attack may be attempting to implement a foreign execution flow during the boot sequence.

Accordingly, as the computing system boots, the validation system monitors characteristics of executing programs such that the monitoring process can compute a graph of the programs as a point of comparison against the PEG. The validation system may compute the graph in real-time as the boot sequence is occurring as a point of reference against the PEG. Thus, the validation system generally expects the computed graph to be isomorphic in relation to the PEG (i.e., an equal form/shape). In any case, the validation system compares the identified executing programs and an execution order thereof to the PEG in order to validate the boot sequence, whether in the form of a computed graph or piecewise.

When the observed boot sequence does not match the PEG, the validation system may generate a response. The response may take different forms depending on the implementation but can generally include communicating a report to an operations center about the unauthorized execution or identified malicious program that has been interjected into the program flow. In further implementations, the computing system may take additional or alternative actions as part of the response, such as halting the boot sequence, clearing the memory of sensitive information, and so on. In this way, the present approach improves the security of programs by implementing an efficient mechanism for validating a boot sequence.

Referring to FIG. 1, an example of a vehicle 100 is illustrated. As used herein, a "vehicle" is any form of powered transport. In one or more implementations, the vehicle 100 is an automobile. While arrangements will be described herein with respect to automobiles, it will be understood that embodiments are not limited to automobiles. In some implementations, the vehicle 100 may instead be an electronic device associated with transportation infrastructure (e.g., roadside unit), a cloud-based system communicating with mobile devices, or other devices that may implement electronic systems that are potentially vulnerable to malicious attack, and thus benefits from the functionality discussed herein.

The vehicle 100 also includes various elements. It will be understood that, in various embodiments, the vehicle 100 may not have all of the elements shown in FIG. 1. The vehicle 100 can have different combinations of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances and provided as remote services (e.g., cloud-computing services).

Some of the possible elements of the vehicle 100 are shown in FIG. 1 and will be described along with subsequent figures. A description of many of the elements in FIG. 1 will be provided after the discussion of FIGS. 2-4 for purposes of the brevity of this description. Additionally, it will be appreciated that for simplicity and clarity of illustration, where appropriate, reference numerals have been repeated among the different figures to indicate corresponding, analogous, or similar elements. Furthermore, it should be understood that the embodiments described herein may be practiced using various combinations of the described elements.

In any case, the vehicle 100 includes a validation system 170 that functions to improve the security of a boot sequence against malicious attacks. Moreover, while depicted as a standalone component, in one or more embodiments, the validation system 170 is integrated with the assistance system 160, or another similar system of the vehicle 100 to facilitate improving the security of functions of the systems/modules associated with automated and other controls of the vehicle 100. The noted functions and methods will become more apparent with a further discussion of the figures.

Figure 2:
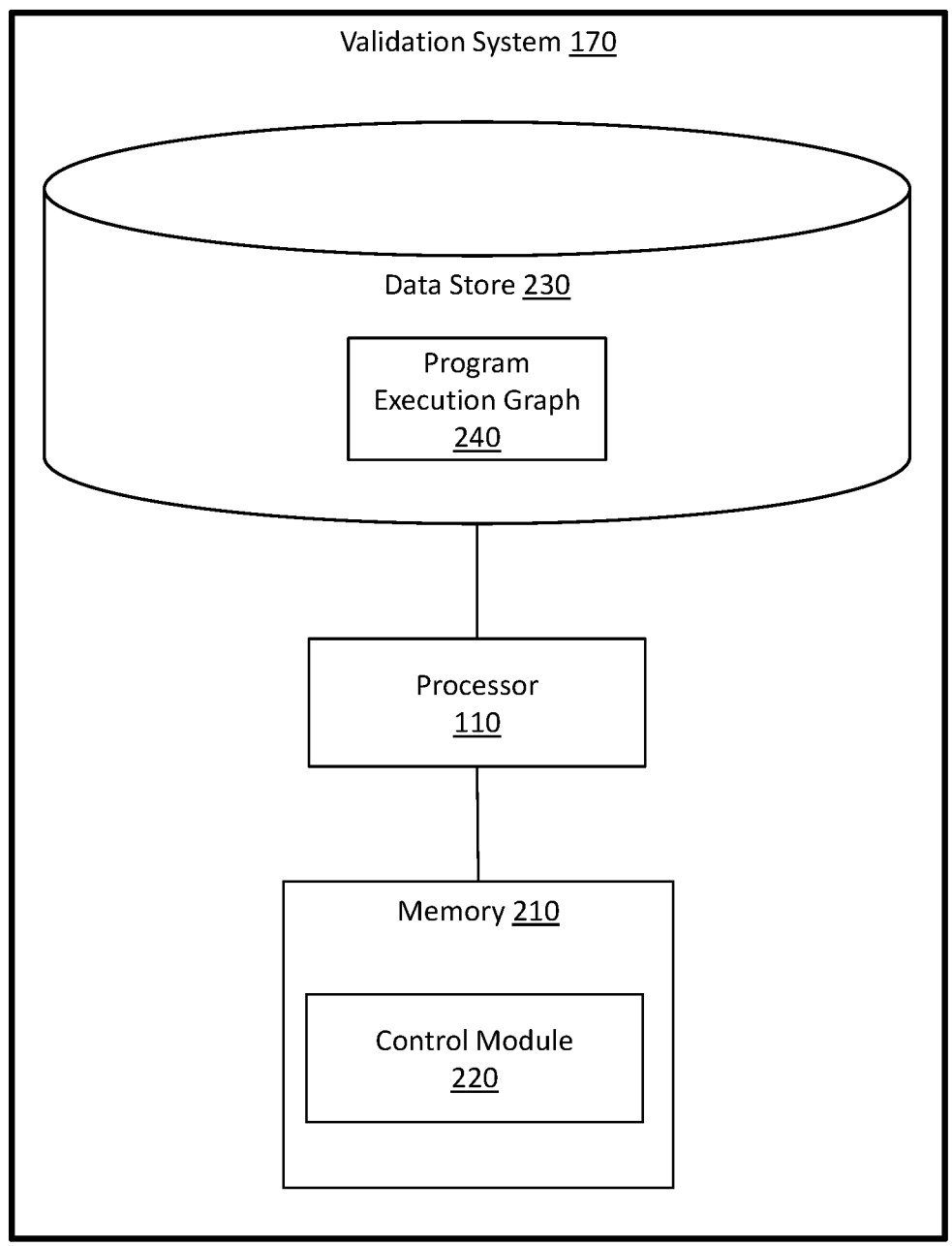
FIG. 2 illustrates one embodiment of a validation system that is associated with validating a boot sequence.

With reference to FIG. 2, one embodiment of the validation system 170 is further illustrated. As shown, the validation system 170 includes a processor 110. Accordingly, the processor 110 may be a part of the validation system 170, or the validation system 170 may access the processor 110 through a data bus or another communication pathway. In one or more embodiments, the processor 110 is an application-specific integrated circuit that is configured to implement functions associated with a control module 220. More generally, in one or more aspects, the processor 110 is an electronic processor, such as a microprocessor that is capable of performing various functions as described herein when executing encoded functions associated with the validation system 170. Moreover, the processor 110 or another electronic processing unit associated with the validation system 170 executes various programs that are to be secured/protected during a boot sequence.

In various embodiments, the particular functionality of a program may vary but can include automated driving functions (e.g., ADAS functions, machine perception, mapping, object detection/identification, path planning, vehicle control routines, and so on), functions associated with control of the vehicle 100, execution of infotainment systems within the vehicle 100, operating systems and associated components, and so on. Thus, various aspects of the program may be related to the functional safety of the vehicle 100, sensitive/personal information, system operation, and so on, which should be protected by improved security measures. Furthermore, it should be appreciated that the program itself can be structured in different ways but is generally formed of multiple segments. The segments include data elements (e.g., variables), and various functions (i.e., blocks of code associated with performing a particular function). Moreover, while the programs are generally described from a functional viewpoint, it should be appreciated that the programs may take different forms. That is, the programs may be firmware, operating systems, applications, and so on. In any case, the vehicle 100 generally loads the programs at startup. That is, as one example, when the vehicle 100 initially starts from a power on signal (e.g., ignition on, push-button start, remote function of mobile applications, etc.), the processor 110 executes a series of commands to initialize the programs, thereby loading the programs in a particular sequence. This sequence is referred to as the boot sequence and involves a particular order of execution for the programs and, in some circumstances, subroutines/functions of the programs. Moreover, the programs may be stored in a memory, such as a basic input/output system ROM or another low-level memory device that stores the programs.

In one embodiment, the validation system 170 includes a memory 210 that stores the control module 220 and, in various configurations, additional elements (e.g., programs). The memory 210 is a random-access memory (RAM), read-only memory (ROM), a hard disk drive, a flash memory, or other suitable memory for storing the module 220. In any case, the control module 220 is, for example, computer-readable instructions that, when executed by the processor 110, cause the processor 110 to perform the various functions disclosed herein. While, in one or more embodiments, the module 220 is instructions embodied in the memory 210, in further aspects, the module 220 includes hardware, such as processing components (e.g., controllers), circuits, etc. for independently performing one or more of the noted functions. Thus, the control module 220 may be embodied as instructions within the memory 210 or as a standalone component, such as a system-on-a-chip (SoC), ASIC, or another electronic device.

Furthermore, in one embodiment, the validation system 170 includes a data store 230. The data store 230 is, in one arrangement, an electronically-based data structure for storing information. For example, in one approach, the data store 230 is a database that is stored in the memory 210 or another suitable electronic storage medium (e.g., RAM, ROM, on-chip cache, etc.), and that is configured with routines that can be executed by the processor 110 for analyzing stored data, providing stored data, organizing stored data, and so on. In any case, in one arrangement, the data store 230 stores data used by the control module 220 in executing various functions. In one embodiment, the data store 230 includes a program execution graph 240 along with, for example, other information (e.g., observed characteristics of executing programs) that is used by the control module 220.

The program execution graph (PEG) 240 is, in one or more arrangements, similar to a control flow graph (CFG). That is, the PEG 240 graphs relationships between the programs in the boot sequence, including at least a sequence of function calls and an order in which the programs load. Thus, the PEG 240 embodies a sequencing of execution steps for the programs executing on, for example, the processor 110, an ECU, or another processing component to provide a reference of the correct flow for the boot sequence. As a further matter, the PEG 240 is pre-generated prior to the boot sequence. That is, for example, when a developer (e.g., OEM) or other entity creates a software package for installation on the vehicle 100, the creator also generates the PEG 240 through analysis of how the programs of the software package execute. Thus, the PEG 240 identifies programs and segments of programs along with when each executes relative to the other. In this way, the PEG 240 provides information for validating the boot sequence. It should be noted that the program identifying information can include various types of identifiers, such as a program ID, a hash of at least a portion of the program, identifying characteristics of how a segment executes (e.g., memory accesses, functions, etc.).

Turning to the functioning of the control module 220, in general, the control module 220 includes instructions that function to control the processor 110 to monitor electronic systems of the vehicle 100 in order to detect the occurrence of an attack. For example, the control module 220 monitors various processing components, such as ECUs, and other processing components. It should be appreciated that the validation system 170 may be integrated with a single processing component (e.g., an ECU) or may monitor multiple different processing components depending on a particular implementation. In any case, the control module 220 tracks the characteristics of the programs executing as part of the boot sequence. In general, the characteristics include an identity and a timing of execution relative to other programs.

From this information, the control module 220 acquires relevant data to compare against the PEG 240 and determine the validity of the presently executing programs. As previously mentioned, the control module 220 may generate a graph of the executing programs in an effort to mirror the PEG 240 and provide a mechanism for comparison. In further aspects, the control module 220 simply tracks execution of the programs by comparison of identified characteristics against the PEG 240. When the control module 220 identifies a foreign flow (i.e., a deviation from the PEG 240), the control module 220 generates a response.

The response may vary depending on the particular implementation but is generally configured to at least provide information about a malicious attack so that the malicious attack can be identified and countered. In certain implementations, the control module 220 can provide a response that is active. For example, the control module 220, in one approach, halts the boot sequence, alerts a user, or performs another action to indicate the occurrence of the attack or counteract the attack. In this way, the validation system 170 improves robustness of the vehicle 100 against attacks on the booting of programs.

Figure 3:
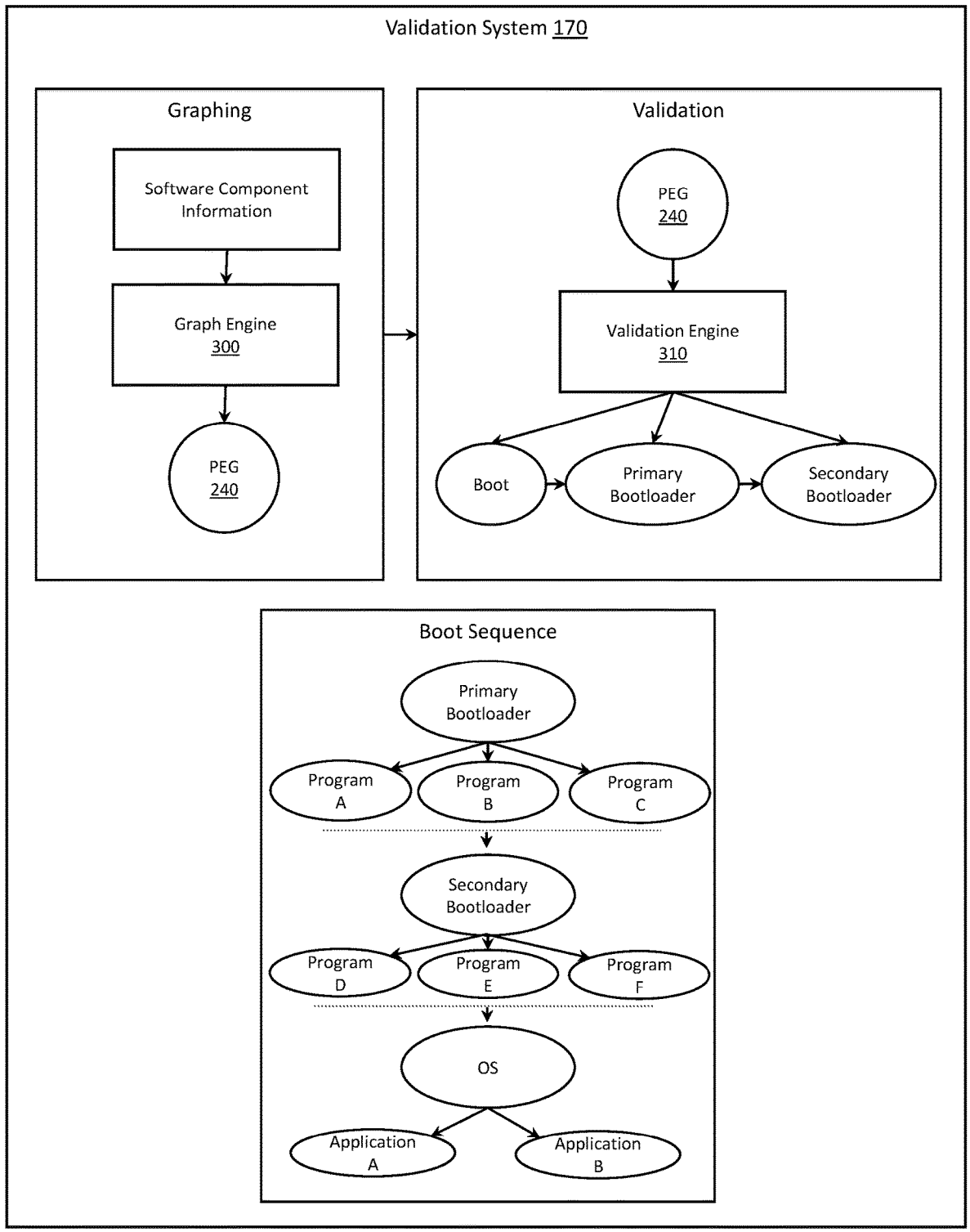
FIG. 3 illustrates examples of sub-modules of the validation system.

As an additional explanation, consider FIG. 3, which illustrates further functions of the control module 220 in combination with a general visualization of a boot sequence. Broadly, the components of the control module 220 as depicted in FIG. 3 are abstractions of different functions and associations thereof along with representations of various elements that may be present within the validation system 170. Thus, the elements described along with FIG. 3 are, in at least one aspect, representative of functions that the instructions of the control module 220 implement when executed by the processor 110.

Accordingly, in FIG. 3, several different aspects of the process undertaken by the control module 220 are shown. For example, graphing of the software components/programs involves a graph engine 300 that produces the PEG 240. Broadly, the graph engine 300 observes the execution and/or emulation of the programs in a test environment and tracks the sequencing of the boot process, including characteristics of programs and the order in which the programs execute. Using this information, the graph engine 300 generates the PEG 240 by graphing relationships between programs and components thereof according to the execution sequence. The graph engine 300 may then provide the PEG 240 with a set of programs/firmware for installation within the vehicle 100 where the PEG 240 itself is maintained in a secure manner for subsequently validating the boot sequence.

The validation engine 310 accepts the PEG 240 as an electronic input and functions to observe execution of the programs. The validation engine 310 acquires the characteristics of the observed execution in order to then validate the boot sequence. For example, the validation engine 310 may observe multiple different tiers of execution that involve an initial boot/system on transitioning into a primary bootloader and then a secondary bootloader that each generally functions to initialize separate programs. FIG. 3 further illustrates one example of a boot sequence. As shown in the exemplary boot sequence, a primary bootloader initially loads three separate programs A, B, and C. Thereafter, the boot sequence transitions to a secondary bootloader that executes programs D, E, and F before an operating system loads and then executes applications, A and B. As such, the validation engine 310 observes the boot sequence, tracks and verifies information about each entity that is loading, and compares the boot sequence with the PEG 240 to validate the loading programs. It should be noted that the validation engine 310, in one or more arrangements, performs the comparison in real-time as the separate entities are loading/executing. In this way, the validation engine 310 can identify a malicious attack when a foreign flow (i.e., a deviation from the PEG 240) occurs.

Figure 4:
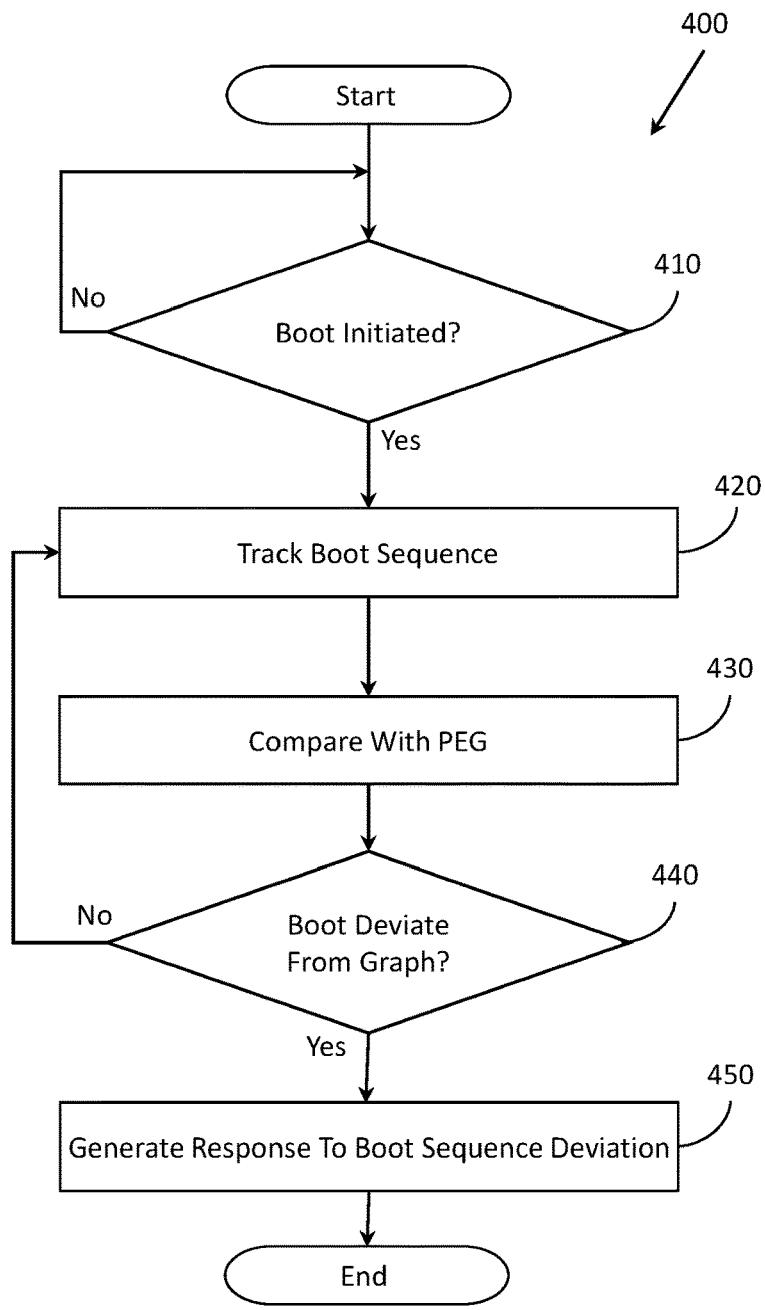
FIG. 4 illustrates one embodiment of a method associated with validating a boot sequence using a program execution graph.

Additional aspects of securing electronic systems of a vehicle against malicious attacks using boot sequence tracking will be discussed in relation to FIG. 4. FIG. 4 illustrates a method 400 associated with using a program execution graph (PEG) to track a boot sequence. Method 400 will be discussed from the perspective of the validation system 170 of FIGS. 1 and 2. While method 400 is discussed in combination with the validation system 170, it should be appreciated that the method 400 is not limited to being implemented within the validation system 170 but is instead one example of a system that may implement the method 400.

At 410, the control module 220 detects the initiation of a boot sequence. In various arrangements, the particular mechanism for determining the start of the boot sequence may vary. For example, when a computing system that the control module 220 monitors is powered on, a power management module therein may provide a signal to the control module 220 indicating the initiation of the boot sequence. In further aspects, the control module 220 may monitor for a particular interrupt or system call through a program interface, including, but not limited to, instruction hooks, memory traces, synchronous and asynchronous callbacks, event handlers, or hypervisor introspection functions. In any case, when the control module 220 detects the initiation of the boot sequence, the control module 220 transitions into a tracking/validating state, as discussed further at block 420.

At 420, the control module 220 tracks the execution of programs in the boot sequence. In one arrangement, the control module 220 tracks characteristics of the programs executing as part of the boot sequence by, for example, identifying segments of the programs as the segments load during the boot sequence. Thus, identifying the characteristics generally includes identifying specific segments of code that are executing, identifying states of execution, a sequence of which programs are loading, program identities, privilege levels, and so on. In one approach, to identify a particular program, the control module 220 may employ cryptographic hashes of the programs, segments of the programs, metadata of the programs, and so on. Whichever approach is undertaken or aspect of the program is analyzed to derive the identifier, the control module 220 acquires the characteristics as the programs load in order to facilitate the subsequent validation. Moreover, it should be appreciated that while the functions of method 400 are discussed in a serial manner, the various functions may occur in parallel such that, for example, as successive programs are identified, the control module 220 functions to validate the boot sequence in real-time as the programs load/execute as opposed to acquiring information for the overall boot sequence and then validating the boot sequence as a whole, or acquiring information for individual programs and validating the individual programs irrespective of the characteristics that pertain to the boot sequence.

At 430, the control module 220 compares the characteristics of the programs as the programs boot with the PEG 240. In one approach, the PEG 240 graphs relationships between the programs in the boot sequence, including at least a sequence of function calls and an order in which the programs load/execute. As previously noted, the PEG 240 is pre-generated prior to the boot sequence and may be provided from a remote source, such as an OEM or other originating entity of the programs. Furthermore, the control module 220 may augment or transform the PEG 240 to correspond with unique characteristics in a particular system. For example, as the validation system 170 may allow dynamically configurable attributes, or software defined features (such as downloadable content, subscription add-ons, functions on-demand, etc.), the PEG 240 may be correspondingly tailored to reflect such kinds of unique characteristics. In any case, the PEG 240 functions as a ground truth for forming a graph isomorphism (i.e., reconstructing the PEG 240 via the observed characteristics). Thus, the control module 220 generally performs a one-to-one comparison between the observed characteristics and the PEG 240 to track a correlation in the executing programs and the PEG 240.

At 440, the control module 220 determines whether the programs correspond with the PEG 240 according to the comparison. In one or more approaches, the control module 220 enforces a strict correspondence since there should not be a deviation between the boot sequence and the PEG 240. However, in further approaches, the control module 220 may permit deviations within a threshold for, for example, load times, memory address ranges, and so on when such values may include marginal differences and are tracked as part of the PEG 240. In any case, if no deviation occurs (i.e., no malicious or altered program is injected into the boot sequence), then the control module 220 transitions to continue tracking the boot sequence until complete. Otherwise, when a deviation is detected, the control module 220 proceeds to generate a response, as discussed at 450.

At 450, the control module 220 provides a response to thwart a malicious program/attack when the boot sequence does not match the PEG 240. Providing the response can include generating a report identifying a foreign flow within the boot sequence when the characteristics of the programs do not match the PEG 240. The control module may generate the report automatically in response to the foreign flow and communicate the report to, for example, a security operations center (SOC), or another entity (e.g., the vehicle owner). The report may include characteristics of the attack, such as a current system state, an identified program that caused the deviation, and so on. In further approaches, the control module 220 halts the boot sequence in order to control the computing system to limit further execution of the programs. This may include exiting to a safe mode (i.e., a system mode that limits execution), stopping subsequent programs, routines, etc., from executing, and so on. In this way, the validation system 170 improves the resilience of the vehicle 100 against attacks on the boot sequence of processing components.

Additionally, it should be appreciated that the validation system 170 from FIG. 1 can be configured in various arrangements with separate integrated circuits and/or electronic chips. In such embodiments, the control module 220 is embodied as a separate integrated circuit. The circuits are connected via connection paths to provide for communicating signals between the separate circuits. Of course, while separate integrated circuits are discussed, in various embodiments, the circuits may be integrated into a common integrated circuit and/or integrated circuit board. Additionally, the integrated circuits may be combined into fewer integrated circuits or divided into more integrated circuits. In further embodiments, portions of the functionality associated with the module 220 may be embodied as firmware executable by a processor and stored in a non-transitory memory. In still further embodiments, the module 220 is integrated as hardware components of the processor 110.

In another embodiment, the described methods and/or their equivalents may be implemented with computer-executable instructions. Thus, in one embodiment, a non-transitory computer-readable medium is configured with stored computer-executable instructions that, when executed by a machine (e.g., processor, computer, and so on), cause the machine (and/or associated components) to perform the method.

While for purposes of simplicity of explanation, the illustrated methodologies in the figures are shown and described as a series of blocks, it is to be appreciated that the methodologies are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional blocks that are not illustrated.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner. "Manual mode" means that all of or a majority of the navigation and/or maneuvering of the vehicle is performed according to inputs received from a user (e.g., human driver).

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is fully automated. In one embodiment, the vehicle 100 is configured with one or more semi-autonomous operational modes in which one or more computing systems perform a portion of the navigation and/or maneuvering of the vehicle 100 along a travel route, and a vehicle operator (i.e., driver) provides inputs to the vehicle to perform a portion of the navigation and/or maneuvering of the vehicle 100 along a travel route. Such semi-autonomous operation can include supervisory control as implemented by the validation system 170 to ensure the vehicle 100 remains within defined state constraints.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 (e.g., data store 230) for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected" or "communicably connected," as used throughout this description, can include direct or indirect connections, including connections without direct physical contact.

In one or more arrangements, the one or more data stores 115 can include map data. The map data can include maps of one or more geographic areas. In some instances, the map data can include information (e.g., metadata, labels, etc.) on roads, traffic control devices, road markings, structures, features, and/or landmarks in the one or more geographic areas. In some instances, the map data can include aerial/satellite views. In some instances, the map data can include ground views of an area, including 360-degree ground views. The map data can include measurements, dimensions, distances, and/or information for one or more items included in the map data and/or relative to other items included in the map data. The map data can include a digital map with information about road geometry. The map data can further include feature-based map data such as information about relative locations of buildings, curbs, poles, etc. In one or more arrangements, the map data can include one or more terrain maps.

The one or more data stores 115 can include sensor data. In this context, "sensor data" means any information from the sensors that the vehicle 100 is equipped with, including the capabilities and other information about such sensors.

As noted above, the vehicle 100 can include the sensor system 120. The sensor system 120 can include one or more sensors. "Sensor" means any device, component, and/or system that can detect, perceive, and/or sense something. The one or more sensors can be configured to operate in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such a case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100.

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself or interior compartments of the vehicle 100. In one or more arrangements, the vehicle sensor(s) 121 can be configured to detect and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system, and/or other suitable sensors. The vehicle sensor(s) 121 can be configured to detect and/or sense one or more characteristics of the vehicle 100. In one or more arrangements, the vehicle sensor(s) 121 can include a speedometer to determine a current speed of the vehicle 100. Moreover, the vehicle sensor system 121 can include sensors throughout a passenger compartment, such as pressure/weight sensors in seats, seatbelt sensors, camera(s), and so on.

Alternatively, or in addition, the sensor system 120 can include one or more environment sensors 122 configured to acquire and/or sense driving environment data. "Driving environment data" includes data or information about the external environment in which an autonomous vehicle is located or one or more portions thereof. For example, the one or more environment sensors 122 can be configured to detect and/or sense obstacles in at least a portion of the external environment of the vehicle 100 and/or information/data about such obstacles. Such obstacles may be stationary objects and/or dynamic objects. The one or more environment sensors 122 can be configured to detect, and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described. As an example, in one or more arrangements, the sensor system 120 can include one or more radar sensors, one or more LIDAR sensors, one or more sonar sensors, and/or one or more cameras. In one or more arrangements, the one or more cameras can be high dynamic range (HDR) cameras or infrared (IR) cameras.

The vehicle 100 can include an input system 130. An "input system" includes, without limitation, devices, components, systems, elements or arrangements or groups thereof that enable information/data to be entered into a machine. The input system 130 can receive an input from a vehicle passenger (e.g., an operator or a passenger). The vehicle 100 can include an output system 140. An "output system" includes any device, component, or arrangement or groups thereof that enable information/data to be presented to a vehicle passenger (e.g., a person, a vehicle passenger, etc.).

The vehicle 100 can include one or more vehicle systems 150. Various examples of the one or more vehicle systems 150 are shown in FIG. 1, however, the vehicle 100 can include a different combination of systems than illustrated in the provided example. In one example, the vehicle 100 can include a propulsion system, a braking system, a steering system, throttle system, a transmission system, a signaling system, a navigation system, and so on. The noted systems can separately or in combination include one or more devices, components, and/or a combination thereof.

By way of example, the navigation system can include one or more devices, applications, and/or combinations thereof configured to determine the geographic location of the vehicle 100 and/or to determine a travel route for the vehicle 100. The navigation system can include one or more mapping applications to determine a travel route for the vehicle 100. The navigation system can include a global positioning system, a local positioning system or a geolocation system.

The processor(s) 110, the validation system 170, and/or the assistance system 160 can be operatively connected to communicate with the various vehicle systems 150 and/or individual components thereof. For example, returning to FIG. 1, the processor(s) 110 and/or the assistance system 160 can be in communication to send and/or receive information from the various vehicle systems 150 to control the movement, speed, maneuvering, heading, direction, etc. of the vehicle 100. The processor(s) 110, the validation system 170, and/or the assistance system 160 may control some or all of these vehicle systems 150 and, thus, may be partially or fully autonomous.

The processor(s) 110, the validation system 170, and/or the assistance system 160 can be operatively connected to communicate with the various vehicle systems 150 and/or individual components thereof. For example, returning to FIG. 1, the processor(s) 110, the validation system 170, and/or the assistance system 160 can be in communication to send and/or receive information from the various vehicle systems 150 to control the movement, speed, maneuvering, heading, direction, etc. of the vehicle 100. The processor(s) 110, the validation system 170, and/or the assistance system 160 may control some or all of these vehicle systems 150.

The processor(s) 110, the validation system 170, and/or the assistance system 160 may be operable to control the navigation and/or maneuvering of the vehicle 100 by controlling one or more of the vehicle systems 150 and/or components thereof. For instance, when operating in an autonomous mode, the processor(s) 110, the validation system 170, and/or the assistance system 160 can control the direction and/or speed of the vehicle 100. The processor(s) 110, the validation system 170, and/or the assistance system 160 can cause the vehicle 100 to accelerate (e.g., by increasing the supply of energy provided to the engine), decelerate (e.g., by decreasing the supply of energy to the engine and/or by applying brakes) and/or change direction (e.g., by turning the front two wheels).

Moreover, the validation system 170 and/or the assistance system 160 can function to perform various driving-related tasks. The vehicle 100 can include one or more actuators. The actuators can be any element or combination of elements operable to modify, adjust and/or alter one or more of the vehicle systems or components thereof responsive to receiving signals or other inputs from the processor(s) 110 and/or the assistance system 160. Any suitable actuator can be used. For instance, the one or more actuators can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more modules that form the assistance system 160. The assistance system 160 can be configured to receive data from the sensor system 120 and/or any other type of system capable of capturing information relating to the vehicle 100 and/or the external environment of the vehicle 100. In one or more arrangements, the assistance system 160 can use such data to generate one or more driving scene models. The assistance system 160 can determine the position and velocity of the vehicle 100. The assistance system 160 can determine the location of obstacles, or other environmental features, including traffic signs, trees, shrubs, neighboring vehicles, pedestrians, and so on.

The assistance system 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The assistance system 160, either independently or in combination with the validation system 170, can be configured to determine travel path(s), current autonomous driving maneuvers for the vehicle 100, future autonomous driving maneuvers, and/or modifications to current autonomous driving maneuvers based on data acquired by the sensor system 120, driving scene models, and/or data from any other suitable source such as determinations from the system state. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The assistance system 160 can be configured to implement determined driving maneuvers. The assistance system 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The assistance system 160 can be configured to execute various vehicle functions and/or to transmit data to, receive data from, interact with, and/or control the vehicle 100 or one or more systems thereof (e.g., one or more of vehicle systems 150).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-4, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product, which comprises all the features enabling the implementation of the methods described herein and, when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Examples of such a computer-readable medium may include but are not limited to, a floppy disk, a flexible disk, a hard disk, a magnetic tape, another magnetic medium, an ASIC, a CD, another optical medium, a RAM, a ROM, a memory chip or card, a memory stick, and other media from which a computer, a processor or other electronic device can read. In the context of this document, a computer-readable storage medium may be any tangible medium that can contain, or store a program for use by or in connection with an instruction execution system, apparatus, or device.

The following includes definitions of selected terms employed herein. The definitions include various examples and/or forms of components that fall within the scope of a term and that may be used for various implementations. The examples are not intended to be limiting. Both singular and plural forms of terms may be within the definitions.

References to "one embodiment," "an embodiment," "one example," "an example," and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Module," as used herein, includes a computer or electrical hardware component(s), firmware, a non-transitory computer-readable medium that stores instructions, and/or combinations of these components configured to perform a function(s) or an action(s), and/or to cause a function or action from another logic, method, and/or system. Module may include a microprocessor controlled by an algorithm, a discrete logic (e.g., ASIC), an analog circuit, a digital circuit, a programmed logic device, a memory device including instructions that, when executed, perform an algorithm, and so on. A module, in one or more embodiments, includes one or more CMOS gates, combinations of gates, or other circuit components. Where multiple modules are described, one or more embodiments include incorporating the multiple modules into one physical module component. Similarly, where a single module is described, one or more embodiments distribute the single module between multiple physical components.

Additionally, module, as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:
1. A validation system, comprising:
one or more processors; and
a memory communicably coupled to the one or more processors and storing:
a control module including instructions that, when executed by the one or more processors, cause the one or more processors to:
responsive to detecting initiation of a boot sequence in a computing system of a vehicle, track characteristics of programs executing as part of the boot sequence by validating segments of the programs as the programs load;

determine whether the programs correspond with a program execution graph (PEG) by comparing the characteristics of the programs as the programs boot with the PEG; and provide a response to thwart a malicious program when the boot sequence does not match the PEG, wherein the PEG graphs relationships between the programs in the boot sequence including at least a sequence of function calls and an order in which the programs load, and wherein the PEG is pre-generated prior to the boot sequence.

2. The validation system of claim 1, wherein the control module includes instructions to track the characteristics of the programs including instructions to identify segments of the programs as the segments load during the boot sequence.

3. The validation system of claim 2, wherein the control module includes instructions to validate the programs as the programs load by verifying a cryptographic hash of respective ones of the programs.

4. The validation system of claim 1, wherein the control module includes instructions to compare the characteristics with the PEG including instructions to identify whether an order of execution for segments of the programs match the PEG.

5. The validation system of claim 1, wherein the control module includes instructions to provide the response including instructions to generate a report identifying a foreign flow within the boot sequence when the characteristics of the programs do not match the PEG.

6. The validation system of claim 1, wherein the control module includes instructions to provide the response including instructions to halt the boot sequence and to control the computing system to limit further execution of the programs.

7. The validation system of claim 1, wherein the validation system is embedded within a processing component of the vehicle.

8. A non-transitory computer-readable medium storing instructions that, when executed by one or more processors, cause the one or more processors to:

responsive to detecting initiation of a boot sequence in a computing system of a vehicle, track characteristics of programs executing as part of the boot sequence by validating segments of the programs as the programs load;

determine whether the programs correspond with a program execution graph (PEG) by comparing the characteristics of the programs as the programs boot with the PEG; and provide a response to thwart a malicious program when the boot sequence does not match the PEG, wherein the PEG graphs relationships between the programs in the boot sequence including at least a sequence of function calls and an order in which the programs load, and wherein the PEG is pre-generated prior to the boot sequence.

9. The non-transitory computer-readable medium of claim 8, wherein the instructions to track the characteristics of the programs includes instructions to identify segments of the programs as the segments load during the boot sequence.

10. The non-transitory computer-readable medium of claim 9, wherein the instructions to validate the programs as the programs load include instructions to verify a cryptographic hash of respective ones of the programs.

11. The non-transitory computer-readable medium of claim 8, wherein the instructions to compare the characteristics with the PEG includes instructions to identify whether an order of execution for segments of the programs match the PEG.

12. A method, comprising:

responsive to detecting initiation of a boot sequence in a computing system of a vehicle, tracking characteristics of programs executing as part of the boot sequence by validating segments of the programs as the programs load;

determining whether the programs correspond with a program execution graph (PEG) by comparing the characteristics of the programs as the programs boot with the PEG; and providing a response to thwart a malicious program when the boot sequence does not match the PEG, wherein the PEG graphs relationships between the programs in the boot sequence including at least a sequence of function calls and an order in which the programs load, and wherein the PEG is pre-generated prior to the boot sequence.

13. The method of claim 12, wherein tracking the characteristics of the programs includes identifying segments of the programs as the segments load during the boot sequence.

14. The method of claim 13, wherein validating the programs as the programs load includes verifying a cryptographic hash of respective ones of the programs.

15. The method of claim 12, wherein comparing the characteristics with the PEG includes identifying whether an order of execution for segments of the programs match the PEG.

16. The method of claim 12, wherein providing the response includes generating a report identifying a foreign flow within the boot sequence when the characteristics of the programs do not match the PEG.

17. The method of claim 12, wherein providing the response includes halting the boot sequence and controlling the computing system to limit further execution of the programs.

\* \* \* \* \*